United States Patent
Fork

Patent Number: 5,986,807
Date of Patent: Nov. 16, 1999

[54] SINGLE BINARY OPTICAL ELEMENT BEAM HOMOGENIZER

[75] Inventor: David K. Fork, Palo Alto, Calif.

[73] Assignee: Xerox Corporation, Stamford, Conn.

[21] Appl. No.: 08/782,140

[22] Filed: Jan. 13, 1997

[51] Int. Cl.[6] ............................................. G02B 5/30
[52] U.S. Cl. ............................................. 359/569; 359/566
[58] Field of Search ................................ 359/15, 569, 566, 359/558

[56] References Cited

U.S. PATENT DOCUMENTS

| | | | |
|---|---|---|---|
| 3,670,260 | 6/1972 | Koester et al. | 359/737 |
| 4,195,913 | 4/1980 | Dourte et al. | 359/853 |
| 4,410,237 | 10/1983 | Veldkamp | 359/569 |
| 5,061,025 | 10/1991 | Debesis | 359/569 |
| 5,315,427 | 5/1994 | Rauch et al. | 359/569 |
| 5,454,004 | 9/1995 | Leger | 372/99 |
| 5,610,733 | 3/1997 | Feldman et al. | 359/15 |
| 5,864,430 | 1/1999 | Dickey et al. | 359/559 |

*Primary Examiner*—Cassandra Spyrou
*Assistant Examiner*—John Juba, Jr.
*Attorney, Agent, or Firm*—William Propp

[57] ABSTRACT

A binary diffractive optical element is used as a single element beam homogenizer. The phase profile of the binary surface relief phase grating structure of the binary diffractive optical element will reprofile diffractively a spatially non-uniform intensity profile of a light beam into multiple overlapping beams which recombine to form a light beam with a more uniform intensity profile.

1 Claim, 7 Drawing Sheets

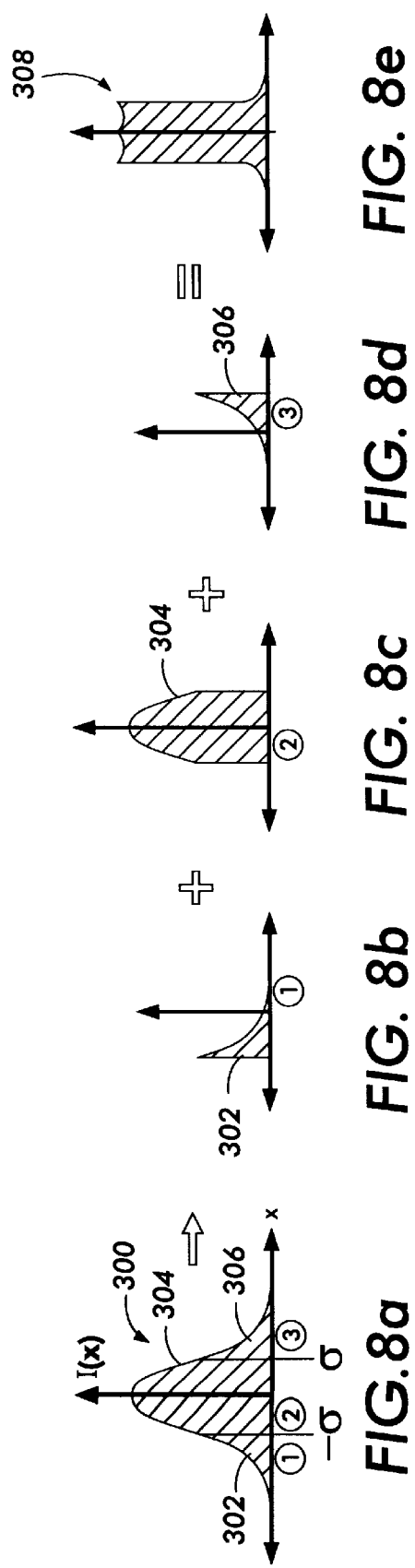

SINGLE BINARY OPTICAL ELEMENT BEAM HOMOGENIZER

BACKGROUND OF THE INVENTION

This invention relates to a laser beam homogenizer and, more particularly, to a single element binary diffractive optical element beam homogenizer.

Lasers have a wide range of applications involving etching and shaping of a variety of materials by annealing or ablation. For example, lasers can be used in semiconductor device fabrication, microphotolithography and photodeposition. Lasers provide an intense light source which can be precision controlled to etch and shape materials.

However, the effectiveness of a laser in annealing and ablation requires a uniform laser beam intensity profile to produce a smooth and even energy distribution across the material. Ideally, the intensity profile should be rectangular with straight vertical sides and a flat horizontal top.

When a laser is used, there often are variations in the etching and shaping across the resulting material. The variations stem from the non-uniform intensity distribution of the laser light. Generally, the intensity of a laser beam has a spatially non-uniform distribution, peaking at the center of the beam and gradually decreasing towards the circumference of the beam.

A homogenizer is often used to achieve better uniformity in light intensity. The laser beam in a typical homogenizer is often divided into multiple sections, which are then redirected to different positions and overlapped back together to produce a beam with a more uniform intensity profile distribution. This process is referred to as "beam-folding".

However, the overlapping beams, resulting from beam-folding, interfere with each other to form a standing wave pattern which creates an intensity modulation or an interference fringe pattern. This intensity modulation in turn creates non-uniformities in the interference pattern on the material.

This intensity modulation problem, also referred to as the "standing wave problem", has been widely observed in photolithography processes using coherent light sources such as lasers. The intensity modulation causes non-uniformity from one location to another in the degree to which a photoresist layer is exposed. One approach to resolve this problem in the photolithography area is to use a homogenizer in which the laser beam moves or scans the target material during the exposure. Since multiple pulses are typically required to expose a photoresist area, each pulse in the series of pulses is spatially offset relative to the next pulse. Better uniformity when exposing photoresist is achieved by moving the laser beam during an exposure because the interference fringe patterns of all the pulses are averaged out.

An example of such an approach to resolve the standing-wave problem is described in U.S. Pat. No. 5,153,773 entitled "Illumination Device Including Amplitude-Division and Beam Movement" invented by Muraki, which teaches the use of a scanning fly-eye homogenizer. The amplitude of the light from a laser source is first divided into two light beams by a polarization beam-splitter, after which the light beams are inputted to a rotating wedge prism which is used to shift their paths and their positions of incidence. By imparting an optical path difference and by shifting the positions of the beams, mutually incoherent light beams are produced to avoid or to minimize the formation of an interference fringe pattern at the material.

However, typical techniques used to improve laser beam intensity uniformity in photolithography processes are generally not applicable to the crystallization of semiconductor materials. If a photoresist layer is irradiated by multiple pulses, the integrated cumulative irradiation of all the pulses would determine the degree to which the photoresist has been exposed. During the exposure process, each laser pulse incrementally increases the degree to which the photoresist has been exposed.

If multiple pulses are applied to a semiconductor target such as silicon, the total energy transferred to the silicon does not determine the material and electrical characteristics of the silicon target. Because silicon has a fast and non-linear response to light intensity or process fluence, the characteristics of the target are primarily determined by the energy output of the last pulse upon the sample. The response time of silicon is so fast that during each pulse, the silicon film will melt and recrystallize. Since the pulse length of a laser shot is approximately 30 nanoseconds, homogenizers which use a moving optical part to smear out the interference patterns of the pulses such as described in the Muraki patent are not generally applicable to crystallization of semiconductor materials. Laser crystallization of silicon requires the intensity of each pulse to be homogeneous because of the fast response time of silicon. However, mechanical parts generally cannot rotate or move sufficiently fast to achieve single-pulse homogeneity.

Current beam homogenizers used for prior art laser applications are plagued with several problems. In their simplest form, a homogenizer 10 of FIG. 1 consists of a beam expander lens 12, a beam condenser 14 and a biprism pair 16. A laser light source 18 will emit a coherent light beam 20 which is expanded and contracted by lenses 12 and 14 to achieve a beam of the correct aspect ratio for the biprism pair and divided into four slightly converging beams 22, 24, 26, and 28 by the biprism pair 16, which are then folded into a single beam 30 at the image plane 32.

The four slightly converging coherent light beams form a standing wave pattern which produces an interference fringe pattern in the beam 30 at the image plane 32. This interference fringe pattern produces an intensity distribution, I, which varies in the x and y direction according to $$I(x,y) \sim [1+\cos(2\ kx\ \sin(\theta_x))][1+\cos(2\ ky\ \sin(\theta_y))] \qquad \text{Equation 1}$$

where k is the wavenumber, and θ describes the tilt angle (or convergence angle) induced by the biprism 16 in the x and y directions. As an example, a commercially available homogenizer induces a beam tilt of 13 mrad in the x and y directions, resulting in an interference pattern with a 12 μm pitch. This 12 μm pitch is larger than a thermal diffusion length during the solidification of silicon during pulsed laser crystallization of amorphous silicon. The result is a highly inhomogeneous distribution of grain sizes caused by the rapid spatial variation in fluence. The biprism homogenizer homogenizes macroscopically and dehomogenizes mesoscopically.

The second problem with conventional homogenizers is that the abrupt splitting of the laser beam by the prism faces of the biprism causes edge Fresnel diffraction. The result is predicted by theory to be a 37% spiking of the beam at the edges as shown in FIG. 2 which is in close agreement with actual beam profiles of FIG. 3. FIG. 2 shows the intensity profile of a collimated optical wavefront which has undergone edge diffraction. Rather than being uniformly dark in the shadow region, and uniformly intense in the illuminated clear aperture region, the wavefront diffracts to produce Fresnel oscillations. These oscillations are visible at the edges of a measured beam profile taken on a beam homogenized with a biprism homogenizer. Instead of an edge which abruptly terminates a wavefront, the biprism apex abruptly interrupts the phase profile of the wavefront. The resulting Fresnel edge diffraction is essentially the same in either case. As a practical matter, the Fresnel diffraction undermines the macroscopic homogeneity of the beam profile.

The third problem with conventional homogenizers is that the "beam-folding" operation is not flexibly tailored to the original beam profile. The biprism pair can at best overlap four pieces of the beam profile. This is too inflexible to macroscopically homogenize all but the simplest beam profile functions.

The propagation of a light beam can be changed by three basic means: reflection by a mirror, refraction by a lens and diffraction by a grating. Homogenizers traditionally rely on reflection and refraction as noted to achieve the desired optical transformation. Optical design, based on mirror and lens elements, is a well-established and refined process. Until recently, the problems with diffraction and fabricating high efficiency diffractive elements have made diffractive elements unfeasible components of optical systems.

The diffractive process does not simply redirect a light beam. Diffraction, unlike refraction and reflection, splits a light beam into many beams—each of which is redirected at a different angle or order. The percentage of the incident light redirected by the desired angle is referred to as the diffraction efficiency. The diffraction efficiency of a diffractive element is determined by the element's surface profile. If the light that is not redirected by the desired angle is substantial, the result will be an intolerable amount of scatter in the image or output plane of the optical system.

A diffractive optical echelon has been proposed as a beam-smoothing means for a laser beam in U.S. Pat. No. 4,521,075 to Obenschain et al. Ten or more transparent plates of random heights are stacked together to break a coherent beam into multiple different delayed beamlets. The random beamlets are then focused by a separate condenser lens and overlapped so that the interference pattern of the resulting beam will average out to a smooth diffraction profile.

However, the Obenschain et al. patent requires ten or more transparent stacked plates. It requires random heights to those plates to delay the transmitted beamlets and it trusts to the law of averages to provide a uniform profile beam.

Theoretically, on-axis diffractive phase elements can achieve 100 percent diffraction efficiency. To achieve this efficiency, however, a continuous phase profile is necessary. The theoretical diffraction efficiency of this surface profile is also relatively sensitive to a change in wavelength. By contrast, refractive elements are wavelength insensitive. The technology for producing high quality, high efficiency, continuous phase profiles does not presently exist.

A compromise that results in a relatively high diffraction efficiency and ease of fabrication is a multi-level phase grating binary diffractive optical element. The larger the number of discrete phase levels, the better the approximation of the continuous phase function. These multi-level phase profiles can be fabricated using standard semiconductor integrated circuit fabrication techniques.

As disclosed in *Binary Optics Technology: The Theory and Design of Multi-level Diffractive Optical Elements* by G. J. Swanson of the Lincoln Laboratory at the Massachusetts Institute of Technology, (Technical Report 854, Aug. 14, 1989) and the resulting U.S. Pat. No. 4,895,790, a fabrication process starts with a mathematical phase description of a diffractive phase profile and results in a fabricated multi-level diffractive surface. The first step is to take the mathematical phase expression and generate from it a set of masks that contain the phase profile information. The second step is to transfer the phase profile information from the masks into the surface of the element specified by the lens design.

The first step involved in fabricating the multi-level element is to mathematically describe the ideal diffractive phase profile that is to be approximated in a multi-level fashion. The next step in the fabrication process is to create a set of lithographic masks which are produced by standard pattern generators used in the integrated circuit industry.

A substrate of the desired material, such as Ge, ZnSe, Si, and $SiO_2$, is coated with a thin layer of photoresist. A first lithographic mask is then placed in intimate contact with the substrate and illuminated from above with an ultraviolet exposure lamp. Alternately, pattern generators, either optical or electron beam, can expose the thin layer of photoresist. The photoresist is developed, washing away the exposed resist and leaving the binary grating pattern in the remaining photoresist. This photoresist will act as an etch stop.

The most reliable and accurate way to etch many optical materials is to use reactive ion etching. The process of reactive ion etching anisotropically etches material at very repeatable rates. The desired etch depth can be obtained very accurately. The anisotropic nature of the process assures a vertical etch, resulting in a true binary surface relief profile. Once the substrate has been reactively ion etched to the desired depth, the remaining photoresist is stripped away, leaving a binary phase surface relief grating.

The process may be repeated using a second lithographic mask having half the period of the first mask. The binary phase element is recoated with photoresist and exposed using the second lithographic mask which has half the period of the first mask. After developing and washing away the exposed photoresist, the substrate is reactively ion etched to a depth half that of the first etch. Removal of the remaining photoresist results in a 4 level approximation to the desired profile. The process may be repeated a third and fourth time with lithographic masks having periods of one-quarter and one-eighth that of the first mask, and etching the substrates to depths of one-quarter and one-eighth that of the first etch. The successive etches result in elements having 8 and 16 phase levels. More masks than four might be used, however, fabrication errors tend to predominate as more masks are used.

This process is repeated to produce a multilevel phase relief structure in the substrate. The result is a discrete, computer-generated structure approximating the original idealized diffractive surface. For each additional mask used in the fabrication process, the number of discrete phase levels is doubled, hence the name "binary" optical element or, more precisely, a binary diffractive optical element.

After only four processing iterations, a 16 phase level approximation to the continuous case can be obtained. The process can be carried out in parallel, producing many elements simultaneously, in a cost-effective manner.

A 16 phase level structure achieves 99 percent theoretical diffraction efficiency. The residual 1 percent of the light is diffracted into higher orders and manifests itself as scatter. In many optical systems, this is a tolerable amount of scatter. The fabrication of the 16 phase level structure is relatively efficient due to the fact that only four processing iterations are required to produce the element.

After the first etching step, the second and subsequent lithographic masks have to be accurately aligned to the existing pattern on the substrate. Alignment is accomplished using another tool standard to the integrated circuit industry, a mask aligner.

As noted, the photoresist on the substrate can be exposed with an electron-beam pattern generator. The e-beam direct-write process eliminates masks and their corresponding alignment and exposure problems. Binary optics have also been reproduced using epoxy casting, solgel casting, embossing, injection molding and holographic reproduction.

Binary optical elements have a number of advantages over conventional optics. Because they are computer-generated, these elements can perform more generalized wavefront shaping than conventional lenses or mirrors. Elements need only be mathematically defined: no reference surface is necessary. Therefore, wildly asymmetric binary optics are able to correct aberrations in complex optical systems, and elements can be made wavelength-sensitive for special laser systems.

The diffractive optical elements are generally thinner, lighter and can correct for many types of aberrations and distortions. It is possible to approximate a continuous phase profile with a stepwise profile of discrete phase levels.

It is an object of this invention to provide a single inexpensive optical element as a beam homogenizer.

It is a further object of this invention to provide a binary diffractive optical element as a beam homogenizer.

SUMMARY OF THE INVENTION

In accordance with the present invention, a binary diffractive optical element is used as a single element beam homogenizer. The phase profile of the binary surface relief phase grating structure of the binary diffractive optical element will reprofile diffractively by mapping a spatially non-uniform intensity profile of a light beam into multiple overlapping beams which recombine to form a light beam with a more uniform intensity profile.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8(a) is a graph of a Gaussian intensity profile beam split into three parts during beam folding into a more uniform intensity profile beam by the binary diffractive optical element beam homogenizer of FIG. 7.

FIG. 8(b) is a graph of the first part of the Gaussian intensity profile beam of FIG. 8(a) during beam folding into a more uniform intensity profile beam by the binary diffractive optical element beam homogenizer of FIG. 7.

FIG. 8(c) is a graph of the second part of the Gaussian intensity profile beam of FIG. 8(a) during beam folding into a more uniform intensity profile beam by the binary diffractive optical element beam homogenizer of FIG. 7.

FIG. 8(d) is a graph of the third part of the Gaussian intensity profile beam of FIG. 8(a) during beam folding into a more uniform intensity profile beam by the binary diffractive optical element beam homogenizer of FIG. 7.

FIG. 8(e) is a graph of the overlapping beam folding of the Gaussian intensity profile beam of FIGS. 8(b), 8(c) and 8(d) into a more uniform intensity profile beam by the binary diffractive optical element beam homogenizer of FIG. 7.

DESCRIPTION OF THE PREFERRED EMBODIMENT

Figure 1:
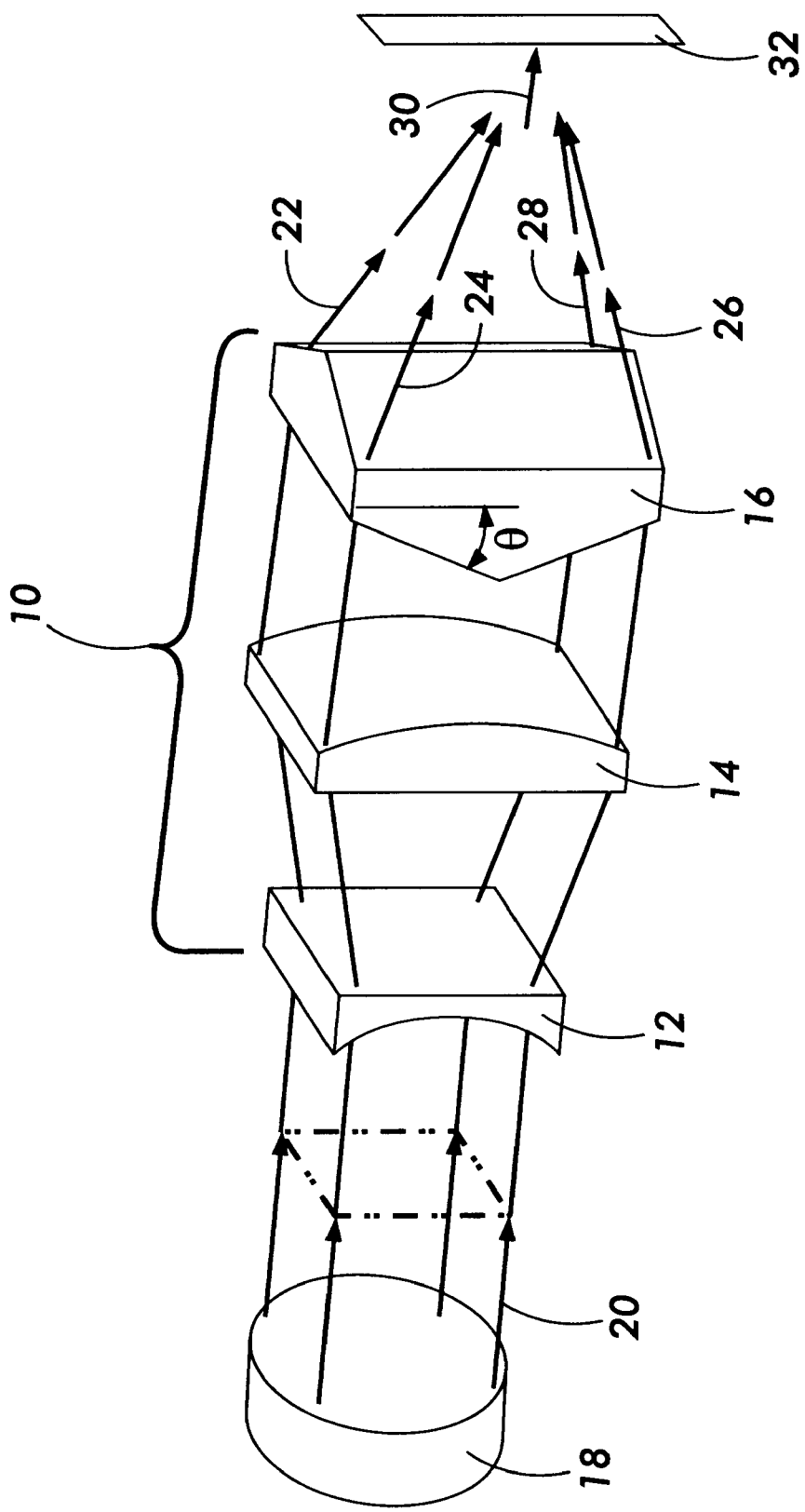
FIG. 1 is a schematic illustration of the cross-section side view of a prior art biprism beam homogenizer.
Figure 2:
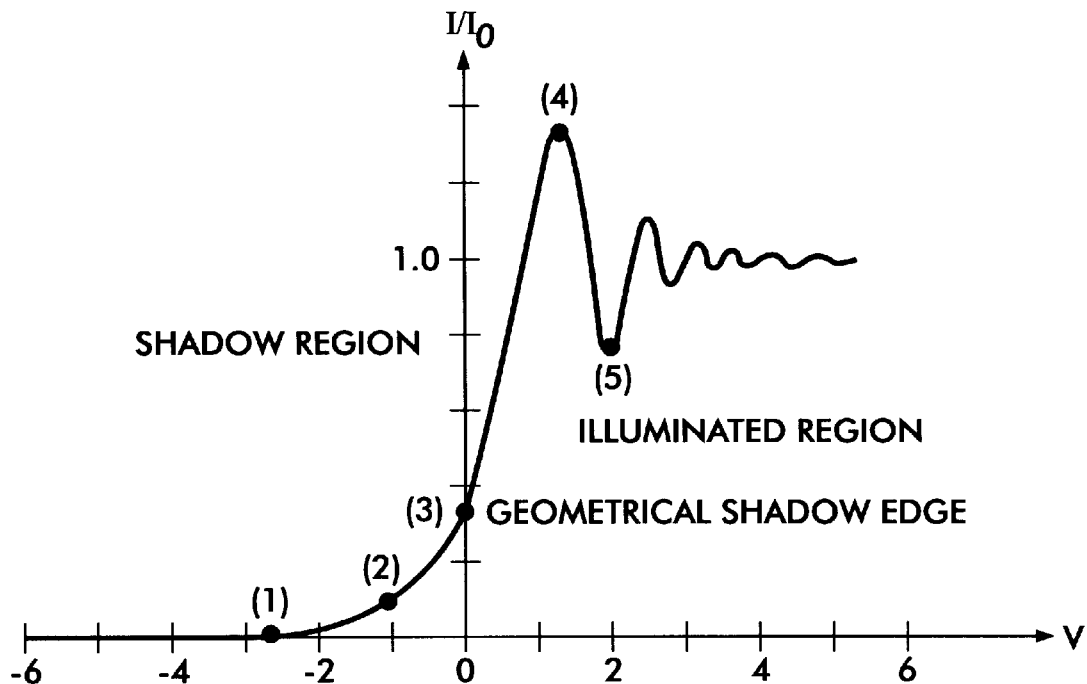
FIG. 2 is a graph of the theoretical edge Fresnel diffraction of the prior art beam homogenizer of FIG. 1.
Figure 3:
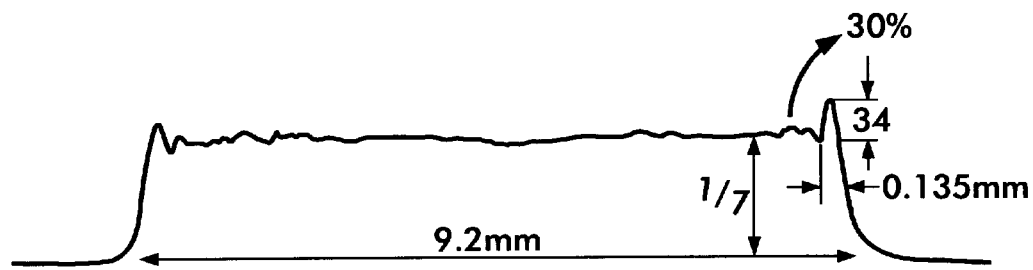
FIG. 3 is a graph of the actual edge Fresnel diffraction of the prior art beam homogenizer of FIG. 1.
Figure 4:
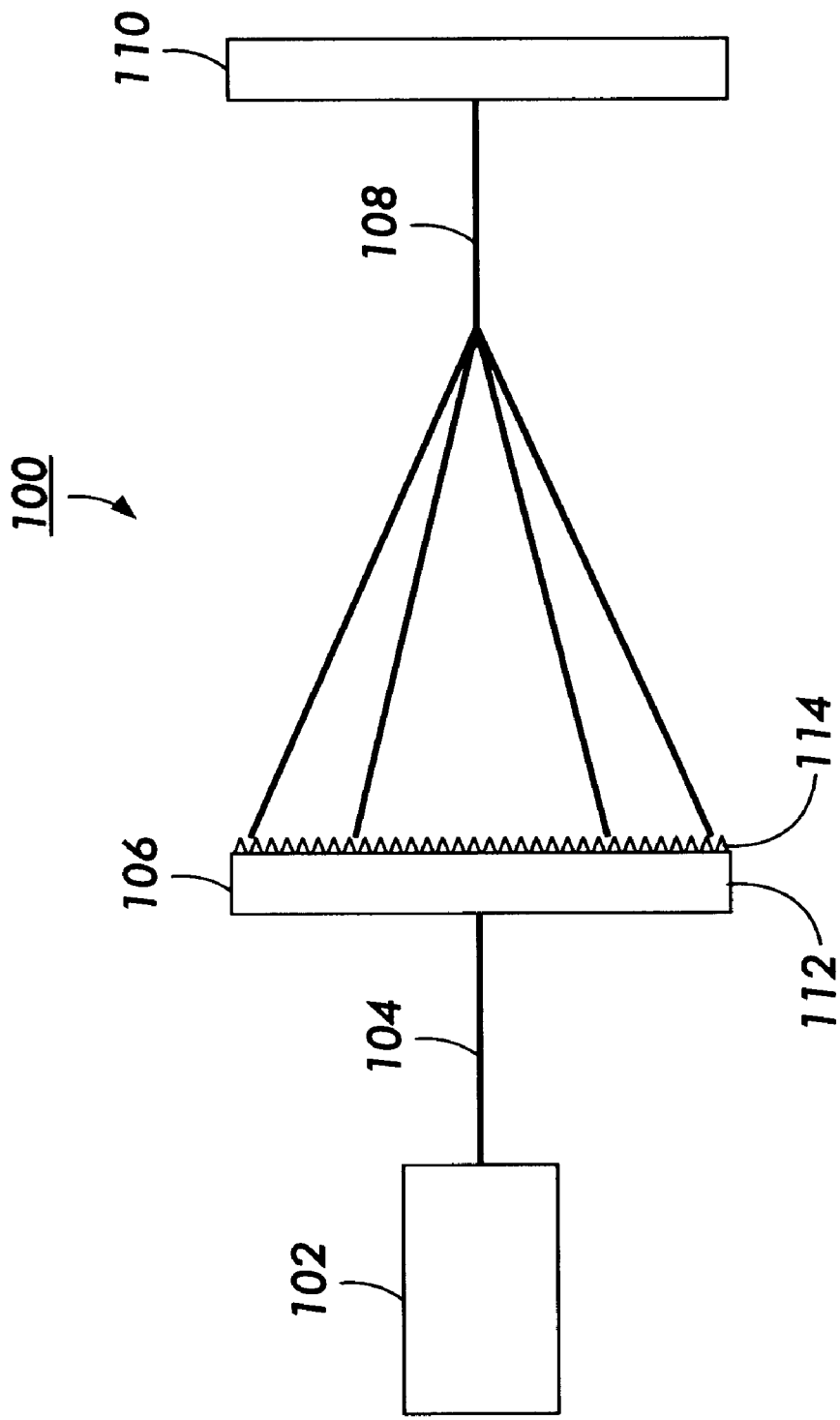
FIG. 4 is a schematic illustration of the cross-section side view of a binary diffractive optical element beam homogenizer in an optical system formed according to the present invention.

Reference is now made to FIG. 4, wherein there is illustrated the homogenizing optical system 100 of the present invention. A laser light source 102 emits a coherent light beam 104 of a single wavelength which is incident upon a binary diffractive optical element beam homogenizer 106. The homogenizer 106 diffracts the beam 104 into multiple beams which overlap to recombine as a homogenized light beam 108 which is then incident upon the image plane 110.

The binary diffractive optical element 106 consists of an optical substrate 112 of $SiO_2$ upon which is a binary surface relief phase grating structure 114.

Specifically, the binary diffractive optical element beam homogenizer 106 will reprofile diffractively by beam folding the Gaussian intensity profile of the emitted light beam 104 into a more uniform intensity profile of the homogenized light beam 108. More specifically, the bell-shape of the intensity profile will be reprofiled by beam folding into a more rectangular shape of the homogenized beam intensity profile.

As noted, the beam homogenizer reprofiles the beam by profile mapping diffractively. A mathematical function maps coordinates of the original beam 104 profile into coordinates of the homogenized beam 108 profile in the image plane 110 by simple minimization techniques. The mapping function is then used to generate the angular deflections and the phase profile of the binary diffractive optical element beam homogenizer 106 by simple geometrical and integral transformations. The beam homogenizer will divide the incident beam into multiple beams which will be overlapped to recombine as a single beam. Any such beam folding homogenizer can be abstracted to a coordinate mapping function. Moreover, a one-to-one remapping of the beam profile, which avoids beam folding, but nonetheless homogenizes the beam is also possible.

Figure 5:
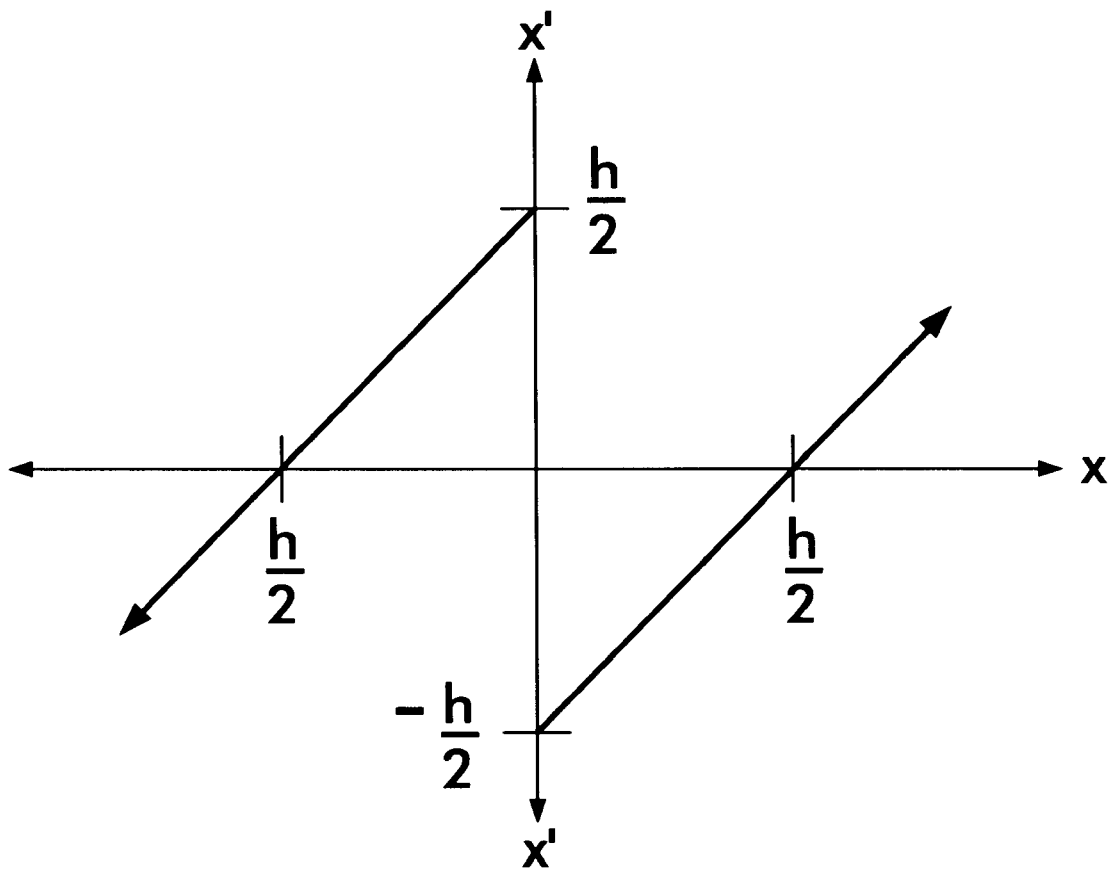
FIG. 5 is a graph of the mapping function of a first embodiment of a simple biprism of the binary diffractive optical element beam homogenizer of FIG. 4.

A simple biprism for example can be described by the mapping function shown in FIG. 5 as $$x' = \begin{cases} x + h/2 & (x < 0) \\ x - h/2 & (x > 0) \end{cases} \quad \text{Equation 2}$$

Figure 6D:
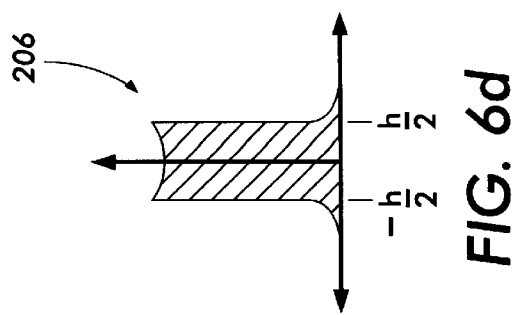
FIG. 6(d) is a graph of the overlapping beam folding of the Gaussian intensity profile beam of FIGS. 6(b) and 6(c) into a more uniform intensity profile beam by the binary diffractive optical element beam homogenizer of FIG. 5.
Figure 6C:
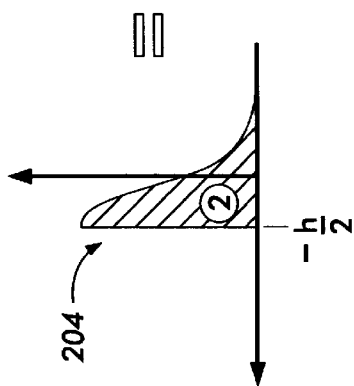
FIG. 6(c) is a graph of the right half of the Gaussian intensity profile beam of FIG. 6(a) during beam folding into a more uniform intensity profile beam by the binary diffractive optical element beam homogenizer of FIG. 5.
Figure 6B:
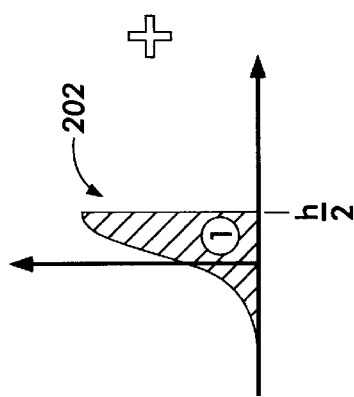
FIG. 6(b) is a graph of the left half of the Gaussian intensity profile beam of FIG. 6(a) during beam folding into a more uniform intensity profile beam by the binary diffractive optical element beam homogenizer of FIG. 5.
Figure 6A:
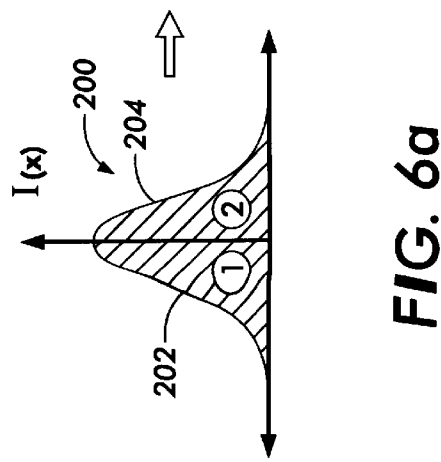
FIG. 6(a) is a graph of a Gaussian intensity profile beam split in half during beam folding into a more uniform intensity profile beam by the binary diffractive optical element beam homogenizer of FIG. 5.

Optically, the Gaussian intensity profile 200 of FIG. 6a will be split in half by the biprism function of FIG. 5 and Equation 2 with the left half 202 of the Gaussian profile in FIG. 6b shifted to the right by a distance of h/2 and with the right half 204 of the Gaussian profile in FIG. 6c shifted to the left by a distance of h/2. The biprism splits and shifts the two halves of the Gaussian profile causing the beams to fold or overlap to form the more uniform intensity profile 206 in FIG. 6d.

If the image plane is a distance L from the biprism, the deflection angle $\alpha(x)$ produced across the surface of the biprism is given by $(x'-x)/L$, or $$\alpha(x) = \begin{cases} h/2L & (x < 0) \\ -h/2L & (x > 0) \end{cases} \quad \text{Equation 3}$$

To then map this deflection profile into an optical element such as the binary diffractive optical element beam homogenizer 106, the deflection in the x direction caused by an optical element goes as $$\frac{1}{k}\frac{\partial \phi(x, y)}{\partial x} \quad \text{Equation 4}$$

and this results in the differential equation $$\alpha(x) - \alpha_0(x) = \frac{1}{k}\frac{\partial \phi(x, y)}{\partial x} \quad \text{Equation 5}$$

where $\alpha_0$ describes the divergence of the incident beam. For an ideally collimated laser source, $\alpha_0$ is zero. Solution for the phase function $\phi(x,y)$ specifies the glass thickness, t, of the optical element through the relation $$t(x, y) = \frac{\phi(x, y)}{k(n - 1)} \quad \text{Equation 6}$$

where n is the index of refraction of the optical element.

This yields a phase profile, $\phi(x,y)$, of $$\phi(x, y) = \begin{cases} \frac{2\pi}{\lambda}(h(x, y)/2L) & (x, y < 0) \\ -\frac{2\pi}{\lambda}(h(x, y)/2L) & (x, y > 0) \end{cases} \quad \text{Equation 7}$$

For the simple biprism example, the thickness profile becomes $$t(x) = \begin{cases} hx/[2L(n - 1)] & (x < 0) \\ -hx/[2L(n - 1)] & (x > 0) \end{cases} \quad \text{Equation 8}$$

and $$t(y) = \begin{cases} hy/[2L(n - 1)] & (y < 0) \\ -hy/[2L(n - 1)] & (y > 0) \end{cases} \quad \text{Equation 9}$$

which, as expected, is a triangle function describing the two prism faces of the biprism.

The binary optical element analogous to the refractive biprism described above has a phase profile given by the solution to equation 5, which the modification that the phase modulo $2\pi$ is used to describe its grating.

In general, however, the phase profile required to optimally homogenize a laser beam without adverse diffraction and interference is more complicated than the linear phase profile of a prism or the quadratic phase profile of a spherical lens. Conventional grinding and polishing methods can only produce flat, prism and spherical optics, which is why multiple optical elements are needed in a conventional homogenizer, usually two to expand or condense and two prisms or a biprism to shift the beam in the x and y directions.

Fabrication of an optimized phase profile is all but impossible except using a binary diffractive optical element, where the resulting phase profile is implemented by lithography and etching. Mask fabrication proceeds from the initial emitted light beam profile and its divergence. A program generates and optimizes the phase profile and converts it into computer data file which is used to generate lithographic masks.

The first illustrative example was for a simple biprism, however, the method of this invention is for an arbitrary phase profile. This mapping function of the conventional biprism of FIG. 5 has a sharp discontinuity at x=0, resulting in the Fresnel edge diffraction mentioned previously.

A continuous, antisymmetric coordinate transformation is required for symmetric beam profiles to be folded. The continuous coordinate transformation helps to avoid the sudden change of phase profile which in the biprism case described above resulted in undesirable Fresnel diffraction. To avoid interference, it is desirable to remap the beam without beam folding. An example of a function for the binary diffractive optical element beam homogenizer which does this, although the technique is more arbitrary, is the transformation shown in FIG. 7 of $$x' = \begin{cases} -(x + 2\sigma)/m & (x < -\sigma) \\ x/m & (-\sigma \leq x \leq +\sigma) \\ -(x + 2\sigma)/m & (x > \sigma) \end{cases} \quad \text{Equation 10}$$

Figure 7:
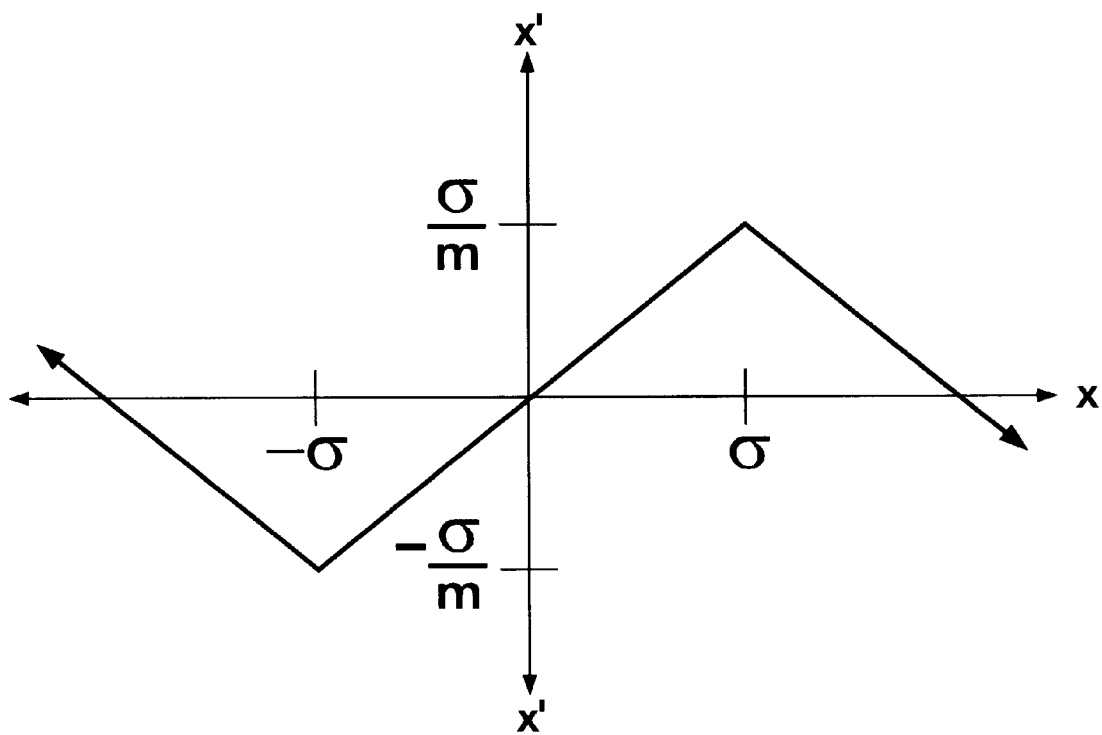
FIG. 7 is a graph of the mapping function of a second embodiment of the binary diffractive optical element beam homogenizer of FIG. 4.

Optically, the Gaussian intensity profile 300 of FIG. 8a will be split into three beam parts by the function of FIG. 7 and Equation 10: one beam part 302 in FIG. 8b at $-\sigma$, one beam part 304 in FIG. 8c at $-\sigma$ to $+\sigma$, and one beam part 306 in FIG. 8d at $+\sigma$, where $+\sigma$ and $-\sigma$ are the points about which the folding operation is desired. The beam part at $-\sigma$ will be reversed about $-\sigma$ and the beam part at $+\sigma$ will be reversed about $+\sigma$. An alternate description is the beam profile is demagnified by a factor m, split into three parts at $\pm\sigma$, and folding the left and right sides over onto the middle. The function splits and shifts the three parts of the Gaussian profile causing the beams to fold or overlap to form the more uniform intensity profile 308 in FIG. 8e.

It should be noted that the beam mapping of FIG. 8 could be accomplished by shifting part 306 to $-\sigma$ and shifting part 302 to $+\sigma$, as opposed to folding the two parts over into the middle part 304. However, this operation would create a discontinuity in the coordinate mapping function.

Scaling and mixing occur simultaneously in one optical element, as opposed to the four optical elements used conventionally in the prior art. This operation is continuous with two adjustable parameters. The phase profile can be mapped onto an optical element as $$\phi(x) = \begin{cases} \frac{2\pi}{\lambda L}\left[\frac{2\sigma x}{m} + \frac{x^2}{2}\left(1 + \frac{1}{m}\right)\right] & (x < -\sigma) \\ \frac{2\pi}{\lambda L}\left[\frac{x^2}{2}\left(1 + \frac{1}{m}\right)\right] & (-\sigma \leq x \leq +\sigma) \\ \frac{2\pi}{\lambda L}\left[\frac{-2\sigma x}{m} + \frac{x^2}{2}\left(1 + \frac{1}{m}\right)\right] & (x > \sigma) \end{cases} \quad \text{Equation 11}$$

and $$\phi(y) = \begin{cases} \frac{2\pi}{\lambda L}\left[\frac{2\sigma y}{m} + \frac{y^2}{2}\left(1 + \frac{1}{m}\right)\right] & (y < -\sigma) \\ \frac{2\pi}{\lambda L}\left[\frac{y^2}{2}\left(1 + \frac{1}{m}\right)\right] & (-\sigma \leq y \leq +\sigma) \\ \frac{2\pi}{\lambda L}\left[\frac{-2\sigma y}{m} + \frac{y^2}{2}\left(1 + \frac{1}{m}\right)\right] & (y > \sigma) \end{cases} \quad \text{Equation 12}$$

where m is the magnification (or demagnification) factor.

Since this equation contains both linear and quadratic terms, the optical element combines prism and spherical lens operations. The resulting wavefront does not contain plane waves. Also, since the mapping function was chosen to be continuous, the derivative of the phase function φ has no "hard edges". The mapping is readily scaled to two dimensions. To illustrate what the transformation does in one dimension consider a Gaussian intensity profile $$I(x,y) \sim e(-x^2/2a^2) \quad \text{Equation 13}$$

The Gaussian beam can be split at its halfway points $\sigma = \pm a(2\ln 2)^{1/2}$ and the edges of the beam folded over onto the middle as shown in FIG. 8. More generally, a simple computer program could optimize free parameters of an arbitrary transformation function for any beam profile.

As stated previously, a 16 phase level binary diffractive optical element such as the beam homogenizer 106 of FIG. 4 theoretically can have a 99% diffraction efficiency. Anti-reflection coatings would ordinarily be applied as well to the beam homogenizer, in the same manner in which spherical lenses are coated. Each etch level induces a phase shift Δφ of $$\Delta\phi = \frac{2\pi}{M} \quad \text{Equation 14}$$

where M is the number of levels in the phase profile, in this case, 16. The phase shift corresponds to a thickness change, Δt, of $$\Delta t = \frac{\lambda}{(1-n)M} \quad \text{Equation 15}$$

For the typical 308 nm wavelength excimer laser used in laser crystallization, Δt=401 Å for a 16 level optical element. The four etching steps would stop at 3208, 1604, 802 and 401 Å respectively.

The other critical lithographic design rule is feature size. The minimum feature size λ in the optical element is determined by the region of most rapidly varying phase $$\delta = \frac{\Delta\phi}{\frac{\partial\phi}{\partial x}\text{MAX}} \quad \text{Equation 16}$$

Thus, the transformation of FIGS. 7 and 8 folds the sides of the Gaussian intensity profile over the middle of the intensity profile. The edges of the binary optical element have the largest deflection, and thus have the minimum feature size. Typical values of parameters for the Gaussian portion of an excimer laser beam are a distance to image plane, L, of 50 cm., an approximate beam half width, a, of 0.5 cm., a demagnification, m, of 3, and a wavelength, λ, of 308 nm.

The phase derivative on the edges of the incident beam where it is reduced to 5% of its maximum value (a reasonable cutoff) yields λ is 0.493 μm, which is within the limits of current lithography.

The single element binary diffractive optical element laser beam homogenizer of the present invention solves the three major problems with conventional multi-element homogenizers of: plane wave interference, Fresnel edge diffraction, and profiling inflexibility. This invention solves all three problems with a single binary optical element which can be produced for significantly less than the cost of a conventional homogenizer. The concept is to use conventional fabrication to produce a two dimensional phase profile on a suitable substrate such as glass or quartz. Successive masking and etching operations define the phase profile.

The simplest commercially available 4 beam homogenizer from Excitech lists for several thousand dollars. Homogenizers for production equipment are much more expensive. A homogenizer made for industrial production interferes 49 plane waves. The present invention described herein is simple to design with straightforward numerical methods and simple to implement by lithography and etching. The single optical element binary diffractive optical element beam homogenizer of the present invention can be fabricated for significantly less than of the cost of the present state of the art.

The two embodiments of the single element binary diffractive optical element laser beam homogenizer of the present invention involved overlapping portions of the laser beam profile with itself, through coordinate mapping operations which either segment, translate and overlap parts of the profile (first embodiment) or which segment, fold and overlap parts of the beam profile (second embodiment). As stated earlier, when two beams overlap at different angles, interference fringes result. To avoid such interferences, it is necessary to have every point at the image surface map into a unique point of the initial beam profile. For an arbitrary, non-uniform initial beam profile, this homogenizer is designed to equalize the intensity distribution by mapping areas of low intensity into proportionally larger areas in the image plane, and by mapping areas of high intensity into proportionally smaller areas in the image plane. As a result, a homogeneous intensity profile is created without beam folding, and therefore without interference. Because the mapping is continuous, abrupt changes in the phase profile are also avoided, thereby reducing or eliminating edge diffraction.

The phase profile implemented through the use of binary diffractive optics may be the result of a purely diffractive element whose optical power is derived solely through the binary surface relief phase grating, or a hybrid device may be constructed, which derives part of it optical power from a refractive surface, such as a lens, and part of its optical power through diffraction. An example could be a plano-convex lens with a diffractive phase profile placed on the planar side of the lens.

In lieu of the optical substrate 112 of the single element binary diffractive optical element laser beam homogenizer 106 of FIG. 4, an optical lens, formed by conventional grinding or polishing means, could be used as the substrate for the binary surface relief phase grating structure 114. The lens can provide optical power in either the x or y plane or both. This permits a simpler design for the optical function of the phase profile of the binary diffractive grating of the homogenizer of the present invention.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam homogenizing optical system comprising a light source for emitting a coherent light beam having a first intensity profile, said first intensity profile being a spatially non-uniform profile, and a beam homogenizer having a binary surface relief phase grating structure upon an optical substrate, said beam homogenizer diffracting said coherent light beam into multiple overlapping beams which recombine to form a light beam with a second intensity profile at an image plane, said second intensity profile being more uniform than said first intensity profile, wherein the phase profile of said binary surface relief phase grating structure approximates $$\phi(x) = \begin{cases} \frac{2\pi}{\lambda L}\left[\frac{2\sigma x}{m} + \frac{x^2}{2}\left(1 + \frac{1}{m}\right)\right] & (x < -\sigma) \\ \frac{2\pi}{\lambda L}\left[\frac{x^2}{2}\left(1 + \frac{1}{m}\right)\right] & (-\sigma \leq x \leq +\sigma) \\ \frac{2\pi}{\lambda L}\left[\frac{-2\sigma x}{m} + \frac{x^2}{2}\left(1 + \frac{1}{m}\right)\right] & (x > \sigma) \end{cases}$$

and $$\phi(y) = \begin{cases} \frac{2\pi}{\lambda L}\left[\frac{2\sigma y}{m} + \frac{y^2}{2}\left(1 + \frac{1}{m}\right)\right] & (y < -\sigma) \\ \frac{2\pi}{\lambda L}\left[\frac{y^2}{2}\left(1 + \frac{1}{m}\right)\right] & (-\sigma \leq y \leq +\sigma) \\ \frac{2\pi}{\lambda L}\left[\frac{-2\sigma y}{m} + \frac{y^2}{2}\left(1 + \frac{1}{m}\right)\right] & (y > \sigma) \end{cases}$$

wherein $\sigma$ is the shift distance of said first intensity profile, $\lambda$ is the wavelength of said coherent light beam, m is the magnification factor and L is the distance between said beam homogenizer and said image plane.

* * * * *